United States Patent [19]
Radlein et al.

[11] Patent Number: 5,817,282
[45] Date of Patent: Oct. 6, 1998

[54] REDUCTION OF NITROGEN OXIDES

[75] Inventors: Desmond Radlein, Waterloo, Canada; Girard Simons, Lynnfield, Mass.; Klaus H. Oehr, Surey; Joe Zhou, Vancouver, both of Canada

[73] Assignee: Dynamotive Technologies Corporation, Vancouver, Canada

[21] Appl. No.: 681,145

[22] Filed: Jul. 22, 1996

Related U.S. Application Data

[63] Continuation-in-part of Ser. No. 623,306, Mar. 28, 1996.

[51] Int. Cl.$^6$ .............................. C10L 9/00; B01D 53/56
[52] U.S. Cl. .............................. 423/235; 44/620; 44/621
[58] Field of Search ........................... 423/235; 518/704; 44/603, 620, 621

[56] References Cited

U.S. PATENT DOCUMENTS

| | | | |
|---|---|---|---|
| 3,970,434 | 7/1976 | Gasior et al. | 44/1 F |
| 4,259,085 | 3/1981 | Ban et al. | 44/26 |
| 4,615,871 | 10/1986 | Yoon | 423/243 |
| 4,678,860 | 7/1987 | Kuester | 585/14 |
| 4,844,878 | 7/1989 | Epperly et al. | 423/235 |
| 5,264,623 | 11/1993 | Oehr et al. | 562/515 |
| 5,458,803 | 10/1995 | Oehr | 252/192 |

FOREIGN PATENT DOCUMENTS

| | | |
|---|---|---|
| 33 24 668 A1 | 1/1985 | Germany . |
| 36 32 720 C1 | 4/1988 | Germany . |
| 54-99076 A | 8/1979 | Japan . |

OTHER PUBLICATIONS

Simons, G.A., "White Paper for Combined No$_x$/SO$_x$ Control in Coal Fired Utilities Using Biomass Waste Feedstock," May 1992, pp. 1–4.

Oehr, K.H. et al., "Biomass Derived Alkaline Carboxylate Road Deicers," The Chameleon Press Limited, London, U.K., May 1992. ISBN 1 872691 50 1, pp. 181–183.

Sharma, P.K., "Calcium Impregnation of Coals as a Means for Sulphur Emissions Control in Combustion," Calcium Magnesium Acetate, An Emerging Bulk Chemical for Environmental Applications pp. 273–284, Elsevier, New York, 1991. No Month.

"Developments in Direct Thermochemical . . ." Elliot et al., Energy and Feuls, vol. 5, pp. 399–410, No. 3 (1991, No Month).

Beckman, D., and Graham, R., "Economic Assessment of a Wood Fast Pyrolysis Plant," AITBC Conference, Interlaken, Switzerland, 1992 May.

Piskorz, J. et al., "Liquid Products from the Fast Pyrolysis of Wood and Cellulose," Research in Thermal Biomass Conversion, Elsevier Science Publishers, New York, 1988, pp. 557–571 (No Month).

*Primary Examiner*—Gary P. Straub
*Assistant Examiner*—Timothy C. Vanoy
*Attorney, Agent, or Firm*—Kate H. Murashige

[57] ABSTRACT

A method is provided for reducing the nitrogen oxide content of a flue gas produced by the combustion of fuel by introducing a nitrogen oxide removal agent into either the nitrogen oxide contaminated flue gas or the fuel to be combusted. The nitrogen oxide removal agent is the reaction product of a carbon compound in a pyrolysis liquor and a nitrogen compound such as ammonia, ammonium hydroxide or urea. The carbon compound is selected from carboxylic acids, phenols, esters, aldehydes and ketones. The pyrolysis liquor is derived from a feed stock containing cellulose, lignin or starch.

16 Claims, No Drawings

REDUCTION OF NITROGEN OXIDES

FIELD OF THE INVENTION

This application is a continuation in part of U.S. application Ser. No. 08/623,306 filed Mar. 28, 1996, the disclosure of which is incorporated herein by reference.

This invention relates to a method of reducing acid nitrogen oxides from combustion flue gas by injecting an additive directly into the combustor, combustion zone or into the flue gas to reduce said nitrogen oxides.

DESCRIPTION OF THE PRIOR ART

Ozone depletion and acid rain are problems throughout the world. The deterioration of the ozone layer is creating an epidemic in skin cancer and acid rain affects the environment by reducing air quality, rendering lakes acid and killing vegetation, particularly trees. It has been the subject of international dispute. Canada and the United States have argued over the production of acid rain. Britain and Scandinavia are other antagonists.

The oxides of nitrogen are known to be precursors to acid rain and NO is a catalytic agent in the destruction of the ozone layer. $N_2O$ is both a greenhouse gas, 270 times more absorptive than carbon dioxide, and a precursor to NO formation in the ozone layer. It has been argued that $N_2O$ photo-dissociation in the ozone layer is a greater source of NO than is the direct flux of NO from the earth's surface. The emission of oxides of nitrogen in the United States and Canada is about one fifth sulphur dioxide emissions. But that still means that millions of tons of oxides of nitrogen are fed to the atmosphere each year. Although it is believed that the production of sulphur dioxide has stabilized, larger emissions of the oxides of nitrogen are anticipated because of the increased use of fossil fuels.

With the passage of the International Clean Air Act amendments, such as issued in the United States in 1990, the curbing of NOx emissions has become a priority. Planners for electrical utilities in particular are developing strategies for reducing emissions of nitrogen oxides in the production of electrical and thermal power. The majority of fossil fuel used in power production contains organically bound nitrogen which produces oxides of nitrogen during combustion.

Amines such as ammonia and amides such as urea have been used to react with oxides of nitrogen generated during fossil fuel combustion to produce non-toxic nitrogen gas but urea and ammonia are expensive and are of limited use because they can only be used effectively over very narrow temperature ranges or in the presence of catalysts. The prior art has failed to reveal a process for producing low cost nitrogen containing compounds such as amines or amides which have the ability react with NOx over large temperature ranges typical of those encountered in all types of stationary combustors such as fluidized, pulverized and cyclone boilers or mobile combustors such as oil, gasoline or natural gas burning engines.

Techniques for the rapid pyrolysis of lignocellulosic—or starch—containing waste biomass to produce liquids have been described. These liquids are acidic and corrosive to combustion equipment due to their high carboxylic acid content. The fuel value of such liquors is limited by this acidity.

The prior NOx destruction art suffers from numerous drawbacks. SNCR (Selective Non-Catalytic Reduction) using urea and/or ammonia is confined to operation in a narrow temperature window. Above approximately 1000° C., urea and ammonia decompose and/or oxidize to form nitric oxide and below approximately 900° C. both agents pass excessive amounts of ammonia directly into the exhaust gases. Urea is expensive and ammonia is poisonous, corrosive and is difficult to handle. SCR (Selective Catalytic Reduction) can be effective but requires expensive catalysts and staged combustion, while inexpensive, is of limited effectiveness.

Commonly owned U.S. Pat. No. 5,458,803, issued Oct. 17, 1995, describes and claims a liquor additive to inject into flue gas resulting from the combustion of a sulphur containing fuel to reduce the acid content of the flue gas. The liquor additive comprises a pyrolysis liquor, initially acidic due to the presence of one or more acidic components, but at least partially neutralized by a basic alkaline earth metal compound. The liquor contains at least one thermolabile alkaline earth metal compound formed by the reaction of one or more acidic components with the basic alkaline earth metal compound and able to decompose at flue gas temperature to produce an alkaline compound able to react with sulphur dioxide.

Commonly owned U.S. patent application Ser. No. 491,751 issued Jul. 8, 1997, as U.S. Pat. No. 5,645,805, which is a continuation in part of the application that led to the above U.S. Pat. No. 5,458,803, describes and claims a method of reducing acid emissions and ozone deletion precursors from a flue gas produced by the combustion of sulphur- or nitrogen-containing fuel or acid emissions and ozone deletion precursors from chemical plants. The method of the application comprises introducing into a flue containing the gas an additive derived from the chemical reaction of pyrolysis liquor with an alkaline earth metal compound in the presence of an oxidant. This reaction produces a hydrophobic/hydrophillic mixture containing a plurality of thermolabile alkaline compounds that decompose on heating to produce decomposition products able to react with sulphur dioxide and oxides of nitrogen to eliminate these oxides from the flue gas.

Commonly owned U.S. patent application Ser. No. 552,725 filed Nov. 3, 1995, now abandoned describes and claims a method of decomposing the oxides of nitrogen present in a gas. The method comprises contacting the gas with a catalyst containing a peroxide defect and doped with a metal from Group 1 or Group 2 of the Periodic Table. In a preferred embodiment the gas is a flue gas and the method includes introducing into the flue gas an alkaline earth salt liquor, an alkali metal compound and an organic liquor to produce a mixture of alkaline earth metal salt containing at least two different alkali or alkaline earth metals capable of producing alkali-doped oxides during their thermal decomposition.

The disclosures of the above patent and two applications are incorporated herein by reference.

RELEVANT LITERATURE

Elliot et al., 1990–1991, "Energy and Fuels", Volume 5, pages 399 to 410; Beckman, D., and Graham, R., "Economic Assessment of a Wood Fast Pyrolysis Plant", AITBC Conference, Interlaken, Switzerland 1992; Piskorz J., et al., "Liquid Products from the Fast Pyrolysis of Wood and Cellulose", Research in Thermal Biomass Conversion, Elsevier Science Publishers, New York, 1988, pages 557 to 571, all relate to the rapid pyrolysis of biomass to produce fuels.

SUMMARY OF THE INVENTION

The present invention seeks to produce a method of reducing nitrogen oxides from a flue or a fossil fuel combustor, an additive useful in flue gas combustion and a method of producing that additive, all of which avoid the prior art problems.

Accordingly, and in a first aspect, the present invention is a method of reducing nitrogen oxide content of a flue gas produced by combustion of a fuel, the method comprising introducing into a flue containing the flue gas, a compound selected from the group consisting of pyrolysis liquor and a thermolabile additive derived from a reaction between a pyrolysis liquor and a compound containing an amino group, the reaction producing a mixture containing a plurality of thermolabile organic compounds containing nitrogen and able to decompose at elevated temperatures to produce a decomposition product able to react with the oxides of nitrogen. It should be noted that pyrolysis liquor alone acts to reduce the oxides of nitrogen. Alternatively the liquor may be reactive with a compound containing an amino group, as indicated above.

Preferably the additive is incorporated into the fuel but the additive containing the thermolabile compound may be injected into either the combustion zone or the flue.

The fuel may be, for example, coal, petroleum tar or pitch, fuel oil, diesel oil, gasoline, pyrolysis liquor, natural gas, municipal solid waste, agricultural waste or wood waste.

However in a preferred embodiment the pyrolysis liquor is derived from a feed stock containing cellulose, lignin or starch such as wood waste, agricultural waste, sewage sludge or municipal solid waste. In a preferred embodiment the pyrolysis liquor is derived from a biological source, for example animal or plant waste. A particular advantage of this last embodiment is that nitrogen compounds present in the biological source obviate, or at least reduce, the necessity for the addition of any further nitrogen compound. If necessary or desired the nitrogen compound in the biological source may be supplemented by adding nitrogen compounds.

The normally acidic pyrolysis liquor can be used as is or partially neutralized by amino functional groups such as ammonia (alkaline), ammonium hydroxide (alkaline) or urea (neutral). The acidic components of the pyrolysis liquor, typically carboxylic acids and/or phenols, react with the source of alkaline amino containing functional groups to produce thermolable salts (e.g. ammonium carboxylates and ammonium phenoxides) in the pyrolysis liquor as follows:

$$NH_3 + RCOOH \rightarrow NH_4—COOR \qquad (1)$$

ammonium carboxylate (e.g. ammonium formate, ammonium acetate)

$$NH_4—COOR + heat \rightarrow RCO—NH_2 + H_2O \qquad (2)$$

amide $$NH_3 + R'\text{-}\emptyset\text{-}OH \rightarrow R'\text{-}\emptyset\text{-}O—NH_4 \qquad (3)$$

ammonium phenoxide
(Ø represents a phenyl functional group, R represents H or an organic species, R' represents single or multiple functional groups chemically bonded to the phenyl functional group)

Partial or complete reaction of ammonia or urea with mixtures of carboxylic acids and phenols can be controlled by regulating the pH of the final product mixed. Carboxylic acid salts will be formed at lower pH and phenoxide salts at higher pH.

Alkaline or non-alkaline sources of amino functional groups may also react with carbonyl functional groups of organic compounds such as esters, aldehydes and ketones contained in the pyrolysis liquor to form additional thermolabile compounds such as amines, imines or amides as follows:

(4)

R—CO—NH₂ + R"—OH amide

(5)

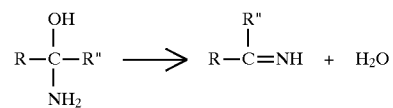

hydroxy-amine        imine

(6)

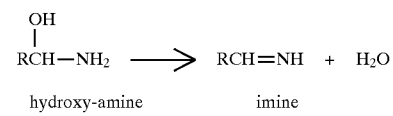

hydroxy-amine        imine

Other sources of compounds containing amino functional groups, such as urea, can be used to react with carbonyl compounds in pyrolysis liquor such as formaldehyde as follows:

(7)

methylolurea

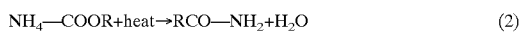

(8)

dimethylolurea

Further addition of formaldehyde to dimethylolurea can result in production of polymers. The chemical reaction of amino functional group containing feedstocks with pyrolysis liquids will result in mixtures of nitrogen containing compounds such as carboxylates, amides, amines and imines as described above in solid, liquid or suspension form. Either the solid, liquid or suspension nitrogen containing pyrolysis liquor product can be used to control NOx emissions during its thermal decomposition during combustion.

If it is desirable to reduce the formation of imine compounds to reduce the degree of polymerization or solids content of the additive, then the pyrolysis liquor can be oxidized with any suitable oxidant such as air or oxygen in the presence or absence of an oxidizing catalyst such as manganese dioxide to convert carbonyl compounds such as aldehydes in the pyrolysis liquor to carboxylic acids as follows:

$$R—CHO + 1/2 O_2 \rightarrow RCOOH \qquad (9)$$

When the pyrolysis liquor is derived from a biological source, for example animal or plant waste, then the nitrogen content of the biological waste reduces or eliminates the need for additional sources of nitrogen, such as urea or ammonia. Animal waste can be recycled for NOx control without introducing substantial amounts of chlorine or sulphur into the combustor. Pober and Bauer in From garbage—Oil, Chemtech, March 1977, page 164, illustrate, particularly in Tables 1 and 4, that the sulphur and chlorine content of the pyrolysis oil is lower than the feedstock. Low chlorine content feedstocks are desirable that reduce the dioxin/furan emissions from combustion. Similarly low sulphur containing feedstocks are desirable in reducing sulphur dioxide emissions during combustion.

According to a further aspect the invention is a composition useful in reducing the nitrogen oxide content of a flue gas produced by combustion of a fuel, the additive comprising the reaction product of pyrolysis liquor with a compound containing an amino group to produce a thermolabile organic compound mixture containing nitrogen and able to decompose at elevated temperature to produce compounds able to react with the oxides of nitrogen.

In a further aspect the invention is a method of producing the above composition that comprises a method of making a composition useful in the reduction of nitrogen oxide emissions from a flue gas produced by combustion of a fuel, the method comprising reacting a pyrolysis liquor with a compound containing an amino group to produce a thermolabile compound mixture containing nitrogen able to decompose at elevated temperature to produce compounds able to react with the oxides of nitrogen.

The invention is illustrated, merely by way of example, in the following Examples:

EXAMPLE 1

Preparation of NOx Control Additive

In this and following example the NOx control additive is referred to as Noxoil. Noxoil was prepared by mixing 10.5 parts by weight pyroliquor derived from sawdust with 2.6 parts ammonium hydroxide. Noxoil contained 4.3% by weight nitrogen.

EXAMPLE 2

Use of Noxoil For NO Control

Solutions containing 25% Noxoil (at 5.3% by weight nitrogen) and 75% by weight of water were injected into gaseous streams containing 800 ppm NO @ 900° C. and 1000° C. The mole ratio of nitrogen in the Noxoil to NO in the gas stream was 4.5 to 1. The liquid mass flow rate was 150 times the NO flow mass rate. The Noxoil achieved a nominal 90% NO removal.

EXAMPLE 3

Use of Noxoil to Enhance Prior Art NOx Control

The above U.S. patent application Ser. No. 491,751 which issued on Jul. 8, 1997 as U.S. Pat. No. 5,645,805 describes a method of reducing acid emissions and ozone depleters from a flue gas. As described in Example 1 of the application, calcium oxide, water and pyrolysis liquor derived from sawdust were blended in the presence of air at 65°–70° C. for 2 hours to produce a mixture of thermolabile calcium organic salts available under the trademark BioLime. This BioLime was diluted with water and filtered to produce an aspiratable filtrate containing 2.5% calcium by weight. The BioLime filtrates alone or mixtures of 3 weight % Noxoil (see Example 1 or 2 above) and 97% weight % BioLime filtrate were injected into gaseous flows containing 800 ppm NO @900° C., 1000° C. and 1100° C. The molar ratio of nitrogen in the Noxoil to NO in the gas was 0.5 to one. The liquid mass flow rate was 150 times the NO mass flow rate. The solutions containing BioLime filtrate alone achieved a nominal 50% NO removal while that spiked with Noxoil achieved 60% nominal NO removal. Urea injection as described in the prior art is essentially ineffective for NO control above 1000° C.

EXAMPLE 4

Pyrolysis Liquor as a Control Agent for Nitrous Oxide Control

A mixture of 25 weight % pyrolysis liquor derived from sawdust and 75% weight % water was filtered and then injected by aspiration into a 300 ppm nitrous oxide containing gas stream at 900° C. The liquid mass flow rate was 275 times the $N_2O$ mass flow rate. This pyrolysis liquor filtrate achieved 54% average nitrous oxide destruction.

EXAMPLE 5

Pyrolysis Liquor as a Control Agent for Nitric Oxide Control

A mixture of 25 weight % pyrolysis liquor derived from sawdust and 75% weight % water was filtered and then injected by aspiration into a 800 ppm nitric oxide containing gas stream at 900° C. and 1000°. The liquid mass flow rate was 150 times the NO mass flow rate. This pyrolysis liquor filtrate achieved 24.5% average nitric oxide destruction.

It is believed that thermal degradation of nitrogen containing pyrolysis liquor components such as amides results in production of free radicals which have the ability to destroy NOx species as follows:

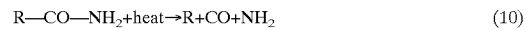

$$R—CO—NH_2 + heat \rightarrow R + CO + NH_2 \tag{10}$$

$$NH_2 + NO \rightarrow N_2 + H_2O \tag{11}$$

$$CO + NO \rightarrow CO_2 + 1/2 N_2 \tag{12}$$

It is believed that pyrolysis liquor decomposition causes decomposition of NOx at elevated temperature due to the formation of carbon monoxide (reactions 10 and 12 above) or free radicals or aldehyde oxidation reactions such as follows:

$$RCHO + N_2O \rightarrow 1/2 N_2 + RCOOH \tag{13}$$

$$RCOOH + heat \rightarrow R + CO + OH \tag{14}$$

$$R + N_2O \rightarrow RO + N_2 \tag{15}$$

$$RCHO + NO \rightarrow RCOOH + 1/2 N_2 \tag{16}$$

Although the forgoing invention has been described in some detail by way of illustration and example for purposes of clarity of understanding, it will be readily apparent to those of ordinary skill in the art in light of the teachings of this invention that certain changes and modifications may be made thereto without departing from the spirit or scope of the appended claims.

We claim:

1. A method for reducing the content of nitrogen oxides in a flue gas produced by combustion of a fuel, the method comprising introducing into the flue gas a nitrogen oxide control additive which is the product of a reaction between a carbon compound contained in a pyrolysis liquor and a nitrogen containing compound, the carbon compound being selected from the group consisting of carboxylic aids, phenols, esters, aldehydes and ketones;

the nitrogen containing compound having an amino functional group; and said pyrolysis liquor being derived from a feed stock containing cellulose, lignin or starch.

2. The method of claim 1 wherein the nitrogen oxide control additive is selected from the group consisting of amines, imines and amides and the carbon compound is selected from the group consisting of esters, aldehydes and ketones.

3. The method of claim 1 wherein the nitrogen oxide control additive is selected from the group consisting of ammonium carboxylates and ammonium phenoxides and the carbon compound is selected from the group consisting of carboxylic acids and phenols.

4. The method of claim 1 wherein the nitrogen containing compound is urea.

5. The method of claim 1 wherein the pyrolysis liquor is derived from a biological source selected from the group consisting of animal wastes and plant wastes and the pyrolysis liquor comprises the nitrogen containing compound.

6. The method of claim 1 further comprising the preliminary step of oxidizing the pyrolysis liquor to convert carbonyl compounds in the pyrolysis liquor to carboxylic acids.

7. The method of claim 6 wherein manganese dioxide is used as a catalyst in the step of oxidizing the pyrolysis liquor.

8. The method of claim 1 wherein the nitrogen oxide control additive is thermolabile and able to decompose at temperatures between 800° C. and 1100° C. to produce compounds able to react with nitrogen oxides to produce nitrogen gas.

9. A method for reducing the content of nitrogen oxides in a flue gas produced by combustion of a fuel comprising introducing into said fuel prior to combustion a nitrogen oxide control additive the nitrogen oxide control additive being the product of a reaction between a carbon compound contained in a pyrolysis liquor and a nitrogen-containing compound, the carbon compound being selected from the group consisting of carboxylic acids, phenols, esters, aldehydes and ketones;

the nitrogen containing compound having an amino functional group; and said pyrolysis liquor being derived from a feed stock containing cellulose, lignin or starch.

10. The method of claim 9 wherein the nitrogen oxide control additive is selected from the group consisting of amines, imines and amides and the carbon compound is selected from the group consisting of esters, aldehydes and ketones.

11. The method of claim 9 wherein the nitrogen oxide control additive is selected from the group consisting of ammonium carboxylates and ammonium phenoxides and the carbon compound is selected from the group consisting of carboxylic acids and phenols.

12. The method of claim 9 wherein the nitrogen containing compound is urea.

13. The method of claim 9 wherein the pyrolysis liquor is derived from a biological source selected from the group consisting of animal wastes and plant wastes and the pyrolysis liquor comprises the nitrogen containing compound.

14. The method of claim 9 further comprising the preliminary step of oxidizing the pyrolysis liquor to convert carbonyl compounds in the pyrolysis liquor to carboxylic acids.

15. The method of claim 14 wherein manganese dioxide is used as a catalyst in the step of oxidizing the pyrolysis liquor.

16. The method of claim 9 wherein the fuel is selected from the group consisting of coal, petroleum tar, pitch, fuel oil, diesel oil, gasoline, natural gas, municipal solid waste, agricultural waste and wood waste.

* * * * *